Patented June 13, 1944

2,351,381

UNITED STATES PATENT OFFICE 2,351,381

PROCESS FOR THE CONVERSION OF KETOXIMES INTO ACID AMIDES

Georg Wiest, Ludwigshafen-on-the-Rhine, Germany; vested in the Alien Property Custodian No Drawing. Application April 19, 1940, Serial No. 330,467. In Germany May 5, 1939

6 Claims. (Cl. 260—239)

The present invention relates to a process for the conversion of ketoximes into acid amides.

In the well-known Beckmann rearrangement of ketoximes at elevated temperatures, sulphuric acid of from 70 to 90 per cent strength is generally used. The presence of water is liable to assist undesired side-reactions, for example the dissociation of the oximes into ketones and hydroxylamine; higher percentages of water may also cause partial saponification of the acid amides formed in the rearrangement. Owing to the presence of aqueous sulphuric acid the process cannot be practiced in iron apparatus.

I have now found that the said side-reactions may practically be eliminated by carrying out the rearrangement with sulphuric acid containing at the utmost 2 per cent of water, i. e. sulphuric acid which is practically free or completely free from water, or oleum. The use of oleum is particularly advantageous if moist oximes are employed; the quantity and concentration of the oleum is then preferably so selected that the proportion of $SO_3$ contained therein will be sufficient to form sulphuric acid monohydrate (i. e. 100% $H_2SO_4$) with the water contained in the oximes. The oximes, as for example acetone oxime, methylnonylketone oxime, cyclohexanone oxime, methylcyclohexanone oxime, 1- and 2-oxodecahydronaphthalene oxime, may be dissolved in sulphuric acid of the said concentration range and run at temperatures of from 80° to 200° C., while stirring, into concentrated sulphuric acid which, as a diluent, assists the dissipation of the reaction heat. Instead of concentrated sulphuric acid, solutions having already undergone the reaction may also be employed as diluents.

The process is preferably carried out in a continuous manner while pumping the solution already rearranged in a cycle and continuously feeding to it fresh oxime solution or both oxime and sulphuric acid separately either at the same place or at different places. A corresponding quantity of rearranged solution is withdrawn from the cycle at another place. The reaction temperature most favorable for the rearrangement of the oxime used is adjusted by a proper proportioning of the oxime solution to be supplied and/or by outside cooling. The reaction temperature usually lies at between 100 and 150° C. For completing the rearrangement the solution may also be subjected to a subsequent heating if desired. The time of reaction, however, is usually very short, say a few minutes, so that high yields per unit of time and reaction space are obtained. The process may be carried out in iron vessels.

Supplying the oxime and sulphuric acid to the cycle separately renders unnecessary the preparation of the oxime solution. To bring about rearrangement it will be sufficient to employ about ½ to 1 mol of sulphuric acid per each mol of oxime, but larger proportions of sulphuric acid will do no harm either. As practically no undesired side-reactions occur in the process and, in particular, no splitting of the oxime nor saponification of the amide or the lactam formed takes place, the yields are excellent.

The following examples serve to illustrate how the present invention may be carried out in practice, but the invention is not restricted to the said examples. The parts are by weight.

Example 1

A solution of 550 parts of cyclohexanone oxime in 500 parts of sulphuric acid monohydrate is run into 500 parts of a solution of 1 mol of ε-caprolactam in 1 mol of sulphuric acid monohydrate at 140° C., while stirring vigorously, the said temperature being kept constant by cooling. After about 30 minutes, when the major part of the oxime has undergone the rearrangement, heating at 140° C. is continued for another 10 to 15 minutes.

The solution, being faintly brown in color, is then run into 2500 parts of methanol at between 10 and 15° C. while stirring. By leading in gaseous ammonia the sulphuric acid is precipitated as ammonium sulphate which is filtered off by suction and washed with methanol. The mother liquor and the methanol used for washing are united and evaporated. By distilling the crude product remaining behind the ε-caprolactam is obtained; after deduction of the amount of lactam added at the start, the yield is calculated to be 96 per cent of the theory.

The lactam may also be obtained by pouring the solution into aqueous caustic alkali solution while strongly cooling and extracting the aqueous solution with a suitable solvent, for example chloroform or ethylene chloride. The lactam may also be obtained by allowing the solution containing the reaction product to flow into milk of lime, filtering off by suction the calcium sulphate formed, evaporating the aqueous solution of the lactam and distilling the evaporation residue.

Example 2

280 parts of 98 per cent sulphuric acid are gradually run into a solution of 100 parts of ε- caprolactam in 100 parts of sulphuric acid monohydrate at between 110° and 120° C., while stirring vigorously; at the same time 340 parts of cyclohexanone oxime are added and the reaction heat is carried off by outside cooling. When all of the oxime has been added, stirring is continued for 20 minutes at 120° C. The reaction mixture is then worked up in the manner indicated in Example 1. By distillation 408 parts of ε-caprolactam are obtained, i. e. 92 per cent of the theory.

*Example 3*

A solution of 50 parts of cyclohexanone oxime in 50 parts of sulphuric acid monohydrate is allowed to flow into 25 parts of sulphuric acid monohydrate at 110° C., while stirring vigorously, another 90 parts of cyclohexanone oxime being gradually added at from 130° to 140° C. Heating is continued at 130° C. for another 30 minutes and the reaction product worked up in the manner indicated in Example 1, ε-caprolactam being obtained in a very good yield.

*Example 4*

115 parts of tert.-butylcyclohexanone oxime (melting point 135° C.) are dissolved in 115 parts of sulphuric acid monohydrate; the solution is introduced, while stirring, into 60 parts of sulphuric acid monohydrate at between 80° and 90° C. while cooling. The solution is further heated for a short time at 110° C., poured onto 500 parts of ice and neutralized with caustic soda solution of 35 per cent strength. The crystals precipitated are filtered off by suction, washed with water and dried. There are obtained 112 parts of the corresponding lactam (ter.-butyl-ε-caprolactam) which when recrystallized from ethyl acetate melts at from 157° to 158° C.

*Example 5*

60 parts of the oxime of cis-beta-oxodecahydronaphthalene are dissolved in 50 parts of sulphuric acid monohydrate and entered, while stirring, into 25 parts of sulphuric acid monohydrate at between 100 and 110° C. After working up in the manner indicated in Example 1, the crude product is distilled. There are thus obtained 56 parts of a mixture of the lactams of 1-aminomethylcyclohexyl-2-propionic acid and 1-beta-amino-ethylcyclohexyl-2-acetic acid which mixture melts at from 89° to 92° C. and boils at from 154° to 155° C. under a pressure of 0.5 millimeter mercury gauge.

*Example 6*

200 parts of 10 per cent oleum are gradually run into a solution of 50 parts of ε-caprolactam in 50 parts of sulphuric acid monohydrate, at between 70° and 90° C., while stirring, 210 parts of cyclohexanone oxime being introduced at the same time. The reaction being finished, heating is continued at 110° C. for 15 minutes. The solution is then diluted with 600 parts of ice and neutralized with caustic soda solution of 35 per cent strength. The ε-caprolactam separates as an oily layer which contains about 34 per cent of water. The bottom layer is shaken with ethyl acetate; the residue remaining after evaporating the ethyl acetate is distilled together with the oily layer. There are obtained 250 parts of ε-caprolactam.

Instead of dry cyclohexanone oxime moist material, for example an oxime containing up to 10 or 15 per cent of water may be employed. In this case it is advantageous to use oleum of high $SO_3$-content in amounts sufficient for converting the water into about 100 per cent sulphuric acid.

What I claim is:

1. In the process for converting ketoximes into acid amides by means of sulphuric acid the step which comprises starting with a moist ketoxime, effecting the conversion by means of an amount of oleum the $SO_3$-content of which is sufficient to form an about 100 per cent sulphuric acid with the water introduced with the oxime the mixture of the reagents being diluted with a liquid comprising sulphuric acid containing at the most 2 per cent of water the total amount of sulphuric acid being sufficient for substantially assisting the dissipation of the reaction heat.

2. In the process for converting ketoximes into acid amides by means of sulphuric acid the step which comprises starting with a moist ketoxime, effecting the conversion by means of an amount of oleum the $SO_3$-content of which is sufficient to form an about 100 per cent sulphuric acid with the water introduced with the oxime the mixture of the reagents being diluted with a reaction mixture resulting from the conversion of the ketoxime concerned into the corresponding acid amide by means of sulphuric acid containing at the most 2 per cent of water in an amount sufficient for substantially assisting the dissipation of the reaction heat.

3. In the process for converting cyclohexanonoxime into ε-caprolactam by means of sulphuric acid the step which comprises effecting the conversion by means of sulphuric acid containing at the most 2 per cent of water the mixture of the reagents being diluted with a liquid comprising sulphuric acid containing at the most 2 per cent of water in an amount sufficient for substantially assisting the dissipation of the reaction heat.

4. In the process for converting cyclohaxanonoxime into ε-caprolactam by means of sulphuric acid the step which comprises starting with moist cyclohexanonoxime, effecting the conversion by means of an amount of oleum the $SO_3$-content of which is sufficient to form an about 100 per cent sulphuric acid with the water introduced with the oxime the mixture of the reagents being diluted with a liquid comprising sulphuric acid containing at the most 2 per cent of water in an amount sufficient for substantially assisting the dissipation of the reaction heat.

5. In the process for converting ketoximes into acid amides by means of sulphuric acid the step which comprises admixing simultaneously a ketoxime and sulphuric acid containing at the most 2 per cent of water with sulphuric acid containing at the most 2 per cent of water and having a temperature sufficiently elevated to initiate the conversion, the total amount of sulphuric acid being sufficient for substantially assisting in the dissipation of the reaction heat.

6. In the process for converting ketoximes into acid amides by means of sulphuric acid the step which comprises effecting the conversion by means of sulphuric acid containing at the most 2 per cent of water the mixture of the reagents being diluted with a liquid comprising sulphuric acid containing at the most 2 per cent of water in an amount sufficient for substantially assisting the dissipation of the reaction heat.

GEORG WIEST.